Nov. 22, 1949  G. E. BERGGREN  2,488,576
EXTRUDING APPARATUS
Filed Jan. 7, 1948  2 Sheets-Sheet 1

INVENTOR·
G. E. BERGGREN
BY
ATTORNEY

INVENTOR
G. E. BERGGREN

Patented Nov. 22, 1949

2,488,576

UNITED STATES PATENT OFFICE 2,488,576

EXTRUDING APPARATUS

George E. Berggren, Baltimore, Md., assignor to Western Electric Company, Incorporated, New York, N. Y., a corporation of New York Application January 7, 1948, Serial No. 1,015

1 Claim. (Cl. 18—13)

This invention relates to extruding apparatus, and more particularly to an apparatus for supporting a plurality of highly flexible cores as they are advanced through such apparatus.

One type of extruding apparatus employed for applying an insulating covering or jacket around one or more conductors being advanced therethrough is provided with an extruding head known as the "self-centering type" such as is shown and described in Cherry et al. Patent 1,862,005, granted June 7, 1932. This type of extruding head is so designed that the component parts thereof are automatically aligned in their proper operating positions.

These component parts consist in part of a core tube and a forming die centrally positioned in tandem in an extruding head so that the end of the tube coacts with the central bore of the die to form an annular extrusion orifice. A conventional stock screw, which is located in an extruding cylinder communicating with the extruding head, forces an extrudable material through this orifice to apply it as an insulating cover or jacket around a core or cores being advanced through the orifice. As the extrudable material emerges from the extrusion orifice it impinges against the core or cores being advanced through the orifice. The impact of the material tends to displace the core or cores with respect to the central axis of the die, in which case an eccentric covering is applied on the core or cores.

In extruding operations where a plurality of highly flexible cores, such as tinsel conductors, are advanced through the orifice to have a jacket extruded therearound, there is an even greater tendency for the material emerging from the extrusion orifice to displace the conductors with respect to the bore of the forming die than is the case with solid conductors or stranded conductors of greater size. Obviously, an eccentric covering or jacket is undesirable, and in some cases, prohibits future use of the product so produced. In order to prevent this condition from occurring, it is desirable to support the conductors as they emerge from the core tube and enter the bore of the die until the forces accompanying the extruding of the cover or jacket therearound have subsided.

An object of the invention is to provide new and improved extruding apparatus.

Another object of the invention is to provide new and improved apparatus for extruding a concentric covering around a plurality of highly flexible conductors.

In accordance with certain features of the invention, there is provided in an extruding apparatus which includes a core tube, a forming die arranged therein to extrude a covering around a plurality of conductors being advanced therethrough, means positioned within the core tube for guiding a plurality of conductors in parallel relationship as they are advanced therethrough, and means provided on the end of the conductor guiding means and extending beyond the end of the core tube for supporting the conuctors emerging from the end of the core tube.

A clear understanding of the invention will be had from the following detailed description of a specific embodiment thereof, when read in conjunction with the appended drawing, in which.

Figures 2, 3, 4, 5:
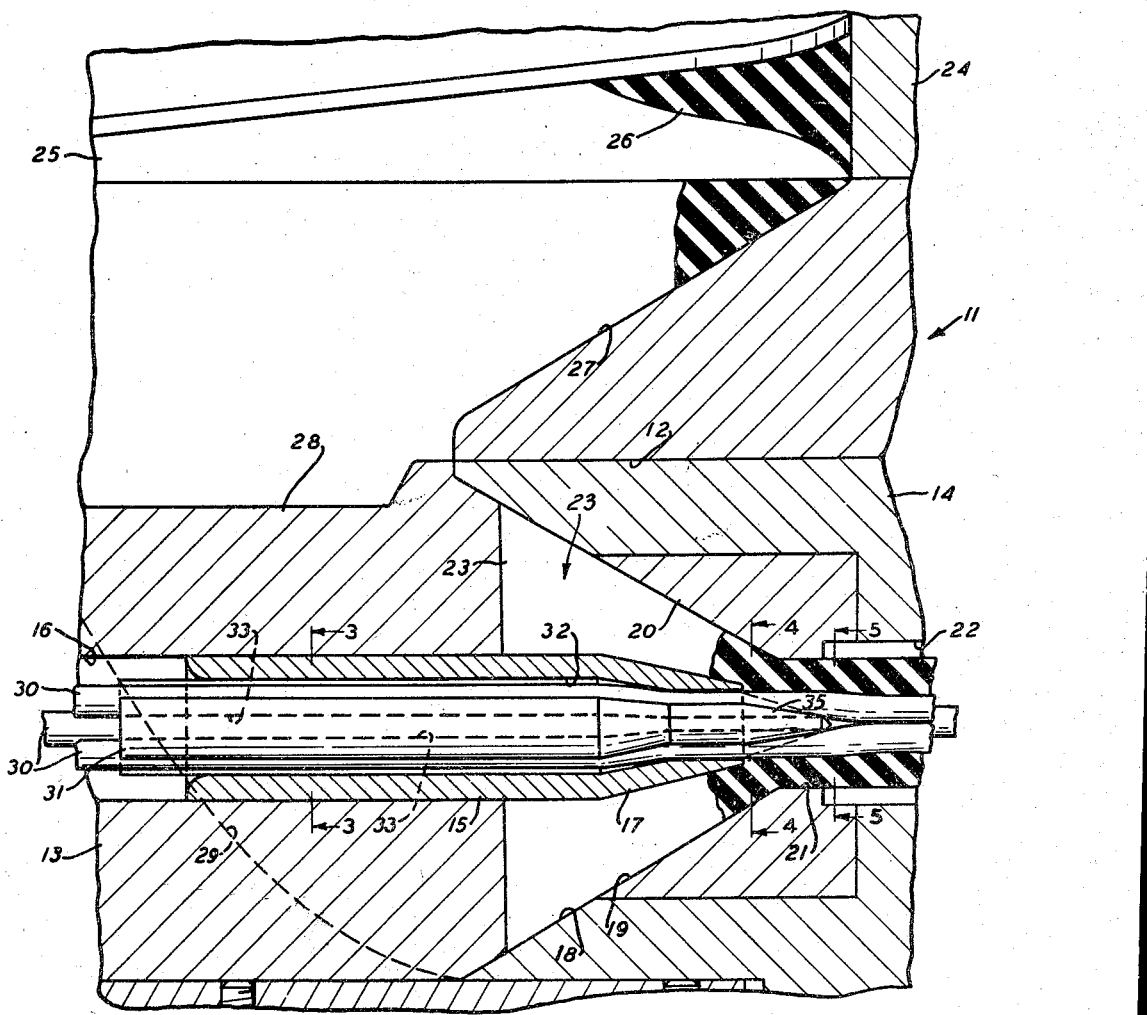
Fig. 2 is an enlarged, fragmentary view of a portion of the apparatus shown in Fig. 1.
Fig. 3 is a vertical, sectional view taken along line 2—2 of Fig. 2.
Fig. 4 is a vertical, sectional view taken along line 3—3 of Fig. 2.
Fig. 5 is a vertical, sectional view taken along line 4—4 of Fig. 2.

Referring now to the drawing, and more particularly to Fig. 2, there is shown a fragmentary, enlarged, longitudinal section of an extruding apparatus provided with a self-centering extruding head of the general type shown in the above-mentioned patent to Cherry et al. In view of the detailed description of such apparatus given in the aforementioned patent, only so much of the apparatus as pertains to the present invention will be described in detail herein.

In general this extruding apparatus comprises a self-centering extruding head 11 provided with a bore 12 in which are positioned an elongated core tube holder 13 and a die holder 14. A core tube 15 is secured in a central bore 16 provided in the core tube holder 13, so that a frustoconical end 17 thereof extends into a tapered bore 18 provided in the die holder 14 and a tapered bore 19 provided on the adjacent end of a forming die 20 positioned in the die holder 14. The tapered bore 19 communicates with a straight bore 21 provided in the remaining portion of the die 20, with the exception of a counterbore 22 provided in the right end of the forming die.

Figure 1:
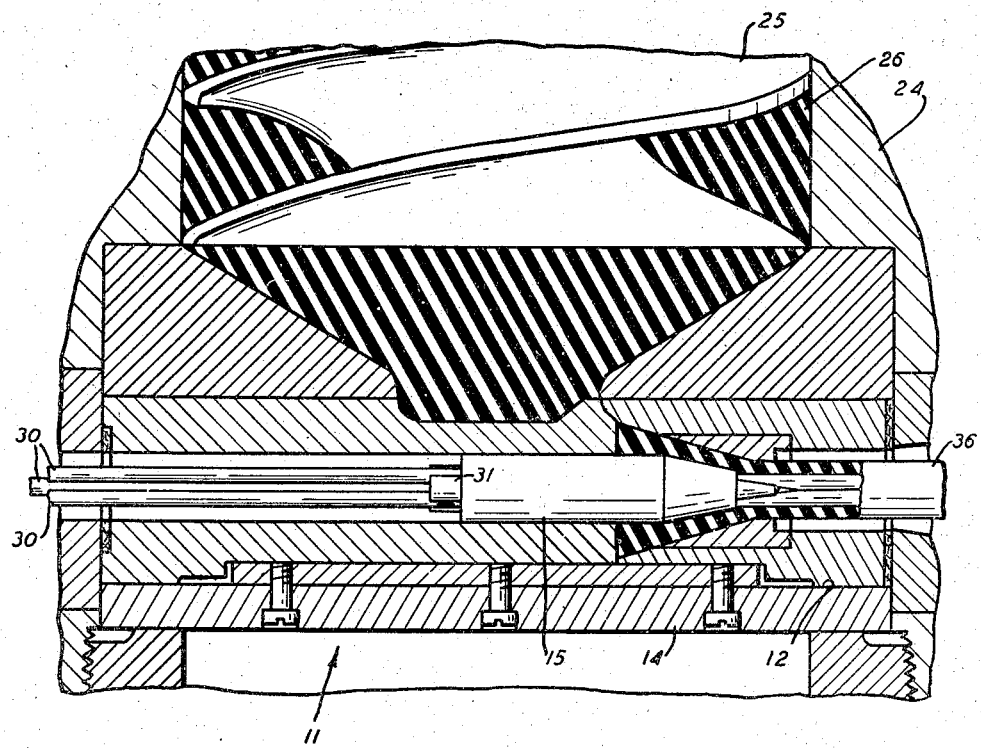
Fig. 1 is a longitudinal, sectional view of a self-centering type of extruding head including a specific embodiment of the invention.

The tapered bore 19 (Figs. 1 and 2) of the die 20 is arranged to be a continuation of the tapered bore 18 provided in the die holder 14. The frustoconical opening formed by the bores 18 and 19 coacts with the frustoconical end 17 of the core tube 15 to form an annular extrusion passage 23 therebetween. The passage 23 extends from the end of the core tube holder 13 to a point of minimum clearance, which occurs at the annular space between the tip end of the frustoconical end 17 and the adjacent portion of the tapered bore 19 of the die 20. The point of minimum clearance will be referred hereinafter as the extrusion orifice of the extruding head 11.

The extruding head 11 (Figs. 1 and 2) is removably secured on the end of an extrusion cylinder 24 having a stock screw 25 rotatably mounted therein for forcing an extrudable material 26 fed into the cylinder 23 from a suitable supply source (not shown) through a funnel-shaped bore 27 provided in the extruding head 11 at right angles to the bore 12. The bore 27 communicates with the bore 12 and serves to direct the material 26 across a relatively thin material dividing fin 28 provided on the end of the core tube holder 13 to an arcuate material guiding surface 29 formed on the end of the core tube subholder on each side of the dividing fin 28. The arcuate surface 29 serves to direct the material 26 toward the extrusion passage 23 and the extrusion orifice at the end thereof. When the apparatus is operating, a continuous tubular stream of extrudable material 26 will emerge from the extrusion orifice in accordance with the well known principles of operation of such apparatus.

The above-described apparatus is generally employed to extrude an insulating covering or a jacket around a single conductor, or around a composite core consisting of a plurality of conductors twisted together, being advanced continuously through a central bore provided in the core tube. It is believed to be apparent from the above general description of the apparatus that as the material 26 is urged through the frustoconical extrusion passage 23, it emerges with considerable force from the extrusion orifice at the end thereof in a direction which is not parallel to the direction of travel of a core being advanced therethrough. Since the force exerted by the material being extruded on the core being covered at the point of application of the extruded tube around the core is directed at an angle with reference to the path of travel of the core, it tends to displace the core with respect to the bore 21 of the die 20, whereby an eccentric covering may be applied around the core. The purpose of the central bore 21 is to perform the final forming operations on the tube extruded through the extrusion orifice and to control the final size and configuration of the covering applied on the core.

When a solid core or a composite twisted core is advanced through such apparatus, even though the twisted core may consist of stranded conductors, the core itself usually possesses sufficient rigidity to prevent it from being deflected sufficiently to cause an eccentric covering to be applied around the core.

However, when the core consists of a plurality of highly flexible conductors 30—30, such as tinsel conductors, and when the conductors are to be held parallel to each other while the covering is extruded therearound, the core tube 15 alone cannot always maintain the conductors positioned centrally in the die against the inherent tendency of the extruded material to displace the conductors. To extrude a covering around such highly flexible and parallel conductors, it is necessary to advance the individual conductors 30—30 through the apparatus in parallel relationship with respect to each other and to hold the individual conductors in their respective positions until the covering is completely formed therearound.

Figure 6:
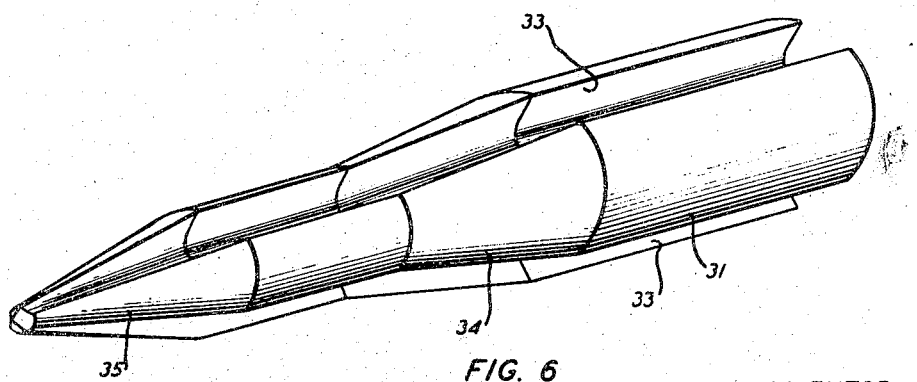
Fig. 6 is an enlarged perspective view of a core tube insert embodying specific features of the invention.

To render the self-centering type of extruding head 11 (Fig. 1) including the core tube 15 capable of extruding a uniform concentric insulating covering or jacket around a group of continuously advancing, parallel conductors, such as the conductors 30—30, an elongated conductor guide 31 (Figs. 2 and 6) is positioned within a bore 32 provided in the core tube 15. The guide 31 fits snugly in the bore 32 and is provided with three longitudinal grooves 33—33, which are substantially semicircular in shape and are equidistantly spaced about the periphery of the guide. The grooves 33—33 coact with the adjacent portions of the bore 32 of the guide 31 to form elongated passages through which the conductors 30—30 are advanced from supply reels (not shown) to the forming die 20. The three semicircular grooves 33—33 result in a cloverleaf cross section of the guide 31, which extends through a substantial portion of the guide. The grooves 33—33 serve to position each of the conductors an equal distance from the central axis of the core tube 15, which spacing is maintained through a substantial portion of the length of the guide 31 to a point at which the diameter of the guide 31 is reduced which point is indicated by the numeral 34 on the drawing. This reduction of the diameter of the guide 31 is necessitated by the reduction in the diameter of the core tube 15 due to the frustoconical end 17. At this point the grooves 33—33 converge inwardly and are thereafter positioned substantially closer to the central axis of the guide, as shown in Fig. 4.

A frustoconical end 35 (Figs. 2 and 6) of the guide 31 extends beyond the end of the core tube 15 into the bore 21 provided in the forming die 20. The end 35 is so shaped that the wall sections between the grooves 33—33 is gradually reduced from the end of the core tube 15 to the tip end of the frustoconical end 35. However, a substantial portion of the bottoms of the grooves 33—33 remains throughout the end 35, and thereby acts as a support for the conductors 30—30 as they are advanced through the bore 21 of the forming die 20.

*Operation*

In the normal operation of the extruding apparatus, the highly flexible conductors 30—30 are advanced continuously from suitable supply reels (not shown) through their respective grooves 33—33 provided in the guide 31 positioned in the core tube 15 and through the central bore 21 of the die 20. The grooves of the guide coact with the adjacent portions of the bore 32 of the core tube 15 to hold the conductors parallel to each other as they travel through the core tube holder 13. As the conductors emerge from the frustoconical end 17 of the core tube 15, they are surrounded by a tube of material 26 being extruded through the extrusion passage 23 and the extrusion orifice formed at the end thereof. The extruded material 26 completely surrounds the conductors 30-30 and the end 35 of the guide 31 (Fig. 4). The conductors 30—30 are firmly supported against displacement at the point where the extruded tube of material 26 first engages them by the end 35 of the guide 31 as seen in Fig. 4. Due to the fact that the end 35 is frustoconical in shape, the walls between the conductors gradually decreases to zero, whereby the extruded material 26 gradually fills in the spaces between the individual conductors 30—30, which was previously occupied by the walls without displacing the conductors with respect to the central axis of the die or with respect to each other. As the conductors 30—30 are advanced through the bore 21, the extruded material 26 is more tightly compressed around the conductors so that when the conductors leave the end 35 they are thereby forced into physical contact with each other and the extrudable material completely fills in the spaces between the conductors to form a covering 36 therearound.

Since the extruded material emerging from the extrusion orifice is not travelling parallel with the conductors when it first contacts them, it has a tendency to displace the conductors with respect to the central bore 21 of the die 20. The purpose of the end 35 is to support the conductors 30—30 as they emerge from the end of the core tube and are contacted by the extruded material 26 emerging from the extrusion orifice so that they will remain positioned centrally with respect to the bore 21 of the die until the covering 36 is completely formed therearound. By the time the forces tending to displace the conductors have been dissipated or redirected in their path of travel, the conductors leave the end 35, and the bore 21 thereafter tightly compresses the material 25 around the conductors 30—30 to form the covering 36. By so supporting the conductors 30—30, the covering 36 is extruded concentrically around them.

It is believed to be apparent that the guide 31 provided with longitudinal grooves 33—33 serves to maintain the flexible conductors 30—30 in parallel relationship with each other as they are advanced through the core tube and die, and that the end 35 formed on the end of the guide continues to support the flexible conductors in their parallel positions, whereby the self-centering type of extruding head is capable of extruding a concentric covering, such as the covering 36 therearound.

The above-described apparatus is adapted to maintain three conductors in a parallel position and to support them while a covering is being extruded therearound. However, the apparatus may be modified so as to maintain and support any reasonable number of parallel conductors, such as four, five or six, without departing from the spirit and scope of the invention.

While the conductors 30—30 in the above-described apparatus have been indicated to be highly flexible conductors, it is believed to be obvious that the apparatus could be employed for use with other types and arrangements of conductors which may be supported while the jacket is being formed therearound by such extruding apparatus in order to obtain a concentric jacket.

What is claimed is:

In an apparatus for extruding an extrudable material around a plurality of continuously advancing conductors including an extruding head having a core tube provided with a central bore and a forming die arranged in tandem therein so that the conductors may be advanced therethrough, the improvement which comprises an elongated guide positioned in the end of the core tube adjacent to the forming die, said guide fitting snugly within the bore of the core tube and having a plurality of longitudinal grooves extending the full length of the guide and equally spaced around the periphery thereof, whereby said grooves coact with the bore of the core tube to form elongated, equally spaced, parallel passages which hold the conductors parallel to each other as they are advanced through the core tube, and a frustoconical end formed on the guide and extending beyond the end of the core tube to support the conductors as they emerge from the core tube and while material is being extruded therearound.

GEORGE E. BERGGREN.

REFERENCES CITED

The following references are of record in the file of this patent:

UNITED STATES PATENTS

| Number | Name | Date |
|---|---|---|
| 37,112 | Sault | Dec. 9, 1862 |
| 326,021 | Cruickshank | Sept. 8, 1885 |